United States Patent
Tang et al.

(10) Patent No.: US 12,366,322 B2
(45) Date of Patent: Jul. 22, 2025

(54) STRIP MOUNTING SYSTEM FOR MOUNTING STRIP

(71) Applicant: SAVANT TECHNOLOGIES LLC, East Cleveland, OH (US)

(72) Inventors: Fangru Tang, Shanghai (CN); Aijun Wang, Shanghai (CN); Zhiyong Wang, Shanghai (CN); Xin Qian, Shanghai (CN); Liang Shan, Beijing (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 18/240,625

(22) Filed: Aug. 31, 2023

(65) Prior Publication Data

US 2024/0077171 A1     Mar. 7, 2024

(30) Foreign Application Priority Data

Sep. 2, 2022 (CN) .......................... 202222335946.6

(51) Int. Cl.
    *F16M 13/02*      (2006.01)
    *F16B 2/20*      (2006.01)
    (Continued)

(52) U.S. Cl.
    CPC ............... *F16N 13/02* (2013.01); *F16B 2/20* (2013.01); *F16B 47/003* (2013.01)

(58) Field of Classification Search
    CPC .......... F16M 13/02; F16B 2/20; F16B 47/003
    See application file for complete search history.

(56) References Cited

U.S. PATENT DOCUMENTS 7,794,132 B2 *   9/2010   Cunius .................. F21V 21/002
                                                                                 362/241
9,909,743 B2 *   3/2018   Dankelmann ......... F21V 21/005
(Continued)

FOREIGN PATENT DOCUMENTS

CN        102356267 A    *    2/2012              F21S 4/20
CN        206545814 U        10/2017
(Continued)

OTHER PUBLICATIONS

Odinest hanger invisible traceless nails hook mounts sold on amazon, dated Mar. 24, 2022, https://www.amazon.com/Odinest-Instantly-Invisible-Traceless-Fasteners/dp/B09WDLWG4J (Year: 2022).*

(Continued)

*Primary Examiner* — Terrell L McKinnon
*Assistant Examiner* — Ding Y Tan (57) ABSTRACT

Disclosed in the present application is a strip mounting system that includes a mounting clip configured to removably receive a strip; and a mounting base configured to be connected to the mounting clip and to be removably connected by headless nails to a surface to be mounted. In a state in which the strip is mounted to the strip mounting system that has been connected to the surface to be mounted, hammered ends of the headless nails are shielded by the strip. A strip can be stably fixed and easy to be taken out or replaced by the strip mounting system, with almost no damage to the wall when the whole strip mounting system is dismounted, a large enough operating space for the hammering of the headless nails during the mounting process, and the headless nails shielded by the strip, thereby providing a good appearance.

11 Claims, 8 Drawing Sheets

(51) Int. Cl.
    *F16B 47/00*    (2006.01)
    *F16N 13/02*    (2006.01)

(56) References Cited

U.S. PATENT DOCUMENTS

2017/0122507 A1*   5/2017   Hoffman ............... F21V 21/005
2018/0299082 A1*  10/2018   Li ........................... F21V 15/01

FOREIGN PATENT DOCUMENTS

| | | | |
|---|---|---|---|
| CN | 207584448 U * | 7/2018 | |
| CN | 209340935 U * | 9/2019 | |
| CN | 114508709 A | 5/2022 | |
| WO | WO-2010106472 A1 * | 9/2010 | ............... F21S 4/20 |

OTHER PUBLICATIONS

ATB double installation LED strip light mounting brackets and clips sold on amazon dated Apr. 18, 2022 https://www.amazon.com/ATB-Installation-Mounting-Organizer-Under-Counter/dp/B09Y4ZK77X (Year: 2022).*

* cited by examiner

STRIP MOUNTING SYSTEM FOR MOUNTING STRIP

CROSS-REFERENCE TO RELATED APPLICATIONS

This application claims the benefit of Chinese Patent Application Serial Number 202222335946.6, filed Sep. 2, 2022, which is incorporated herein by reference.

FIELD OF TECHNOLOGY

The present application relates to a strip mounting system for mounting a strip.

BACKGROUND

In the related art, generally, a strip is mounted using adhesives and clips with screws. However, some surfaces to be mounted may not be suitable for adhesives, and it is sometimes desirable to bend a strip into a pattern on a flat surface; and in this case, an adhesive provided on the back side of the strip and being in the same length as the strip would not be suitable, since the adhesive cannot bend in an axis perpendicular to the surface to be mounted. Furthermore, when dismounted, clips using screws may cause significant damage to a surface to be mounted, such as a wall.

Clips with headless nails or traceless nails provide a new option, but with them comes the problems. How to ensure an enough operating space for the hammering of trackless nails and how to ensure a good appearance of the overall structure after mounting are the problems that needs to be solved when using clips with trackless nails at present.

SUMMARY

In view of this, in order to eliminate or alleviate the described problems, the present application discloses a strip mounting system for mounting a strip. The strip mounting system comprises: a mounting clip configured to removably receive the strip; and a mounting base configured to be connected to the mounting clip and to be removably connected by means of headless nails to a surface to be mounted, wherein in a state in which the strip is mounted to the strip mounting system that has been connected to the surface to be mounted, hammered ends of the headless nails are shielded by the strip.

Further, the mounting clip comprises two first clamping jaws, and the two first clamping jaws extend parallel to each other in a first direction to form a strip receiving space between the two first clamping jaws for receiving the strip.

Further, a first protrusion is provided on each of the surfaces of the two first clamping jaws facing each other, and first recesses in shape-fitting with the first protrusions are provided on the strip, such that when the strip is received in the strip receiving space, the strip is fixed to the mounting clip by means of the shape-fitting of the first recesses with the first protrusions.

Further, the mounting clip further comprises a base plate configured to connect the two first clamping jaws, and two second clamping jaws extending from the base plate in a second direction opposite to the first direction to form a base receiving space between the two second clamping jaws for removably receiving the mounting base.

Further, a second protrusion is provided on each of the surfaces of the two second clamping jaws facing each other, and second recesses in shape-fitting with the second protrusions are provided on the mounting base, such that when the mounting base is received in the base receiving space, the mounting base is fixed to the mounting clip by means of the shape-fitting of the second recesses with the second protrusions.

Further, the spacing between the two second clamping jaws is equal to the spacing between the two first clamping jaws.

Further, the strip mounting system further comprises a double-coated tape being provided on the surface of the mounting base that is in contact with the surface to be mounted.

Further, a through hole extending in the first direction is provided in the base plate, and a part of the end of each of the headless nails that does not enter the mounting base after being hammered is accommodated in the through hole.

Further, the mounting base is integral with the two first clamping jaws and comprises a first surface and a second surface oppose to each other, and the two first clamping jaws extend from the first surface of the mounting base.

Further, the mounting base further comprises a base extension extending, perpendicular to the first direction and parallel to the strip extension direction, beyond the strip receiving space, and the mounting base is connected to the surface to be mounted by the headless nails at the base extension.

Further, the strip mounting system further comprises a double-coated tape being applied on the second surface of the mounting base.

Further, a threaded through hole extending in the first direction is provided in the mounting base, and the mounting base is configured to be fixed by means of a screw passing through the threaded through hole to the surface to be mounted.

By means of such an arrangement, the strip can be stably fixed and easy to be taken out or replaced, almost no damage is caused to the wall when the whole strip mounting system is dismounted, a large enough operating space is provided for the hammering of the headless nails during the mounting process, and the headless nails can be shielded by the strip, thereby providing a good appearance.

BRIEF DESCRIPTION OF THE DRAWINGS

The described and other features and advantages of the present application will become more apparent to a skilled in the art by describing in detail preferred embodiments of the present application with reference to the attached drawings, in which.

Reference signs are as follows:
100; 200 strip mounting system
10 strip
101 first recess
1 mounting clip
11 first clamping jaw
111 first protrusion
12 second clamping jaw
121 second protrusion
13 base plate
131 through hole
2 mounting base
21 second recess
22 base extension
2a first surface
2b second surface
3 headless nail or traceless nail
31 end
4 double-coated tape
5 screw
SS strip receiving space
BS base receiving space
D1 first direction
D2 second direction
D3 strip extension direction
H threaded through hole

DETAILED DESCRIPTION

In order to make the objects, technical solutions and advantages of the present application more apparent, the present application will be further described in detail below with reference to embodiments.

Firstly, with reference to FIGS. 1 to 4, a strip mounting system 100 for mounting a strip 10 according to a first embodiment of the present application is shown.

Figure 1:
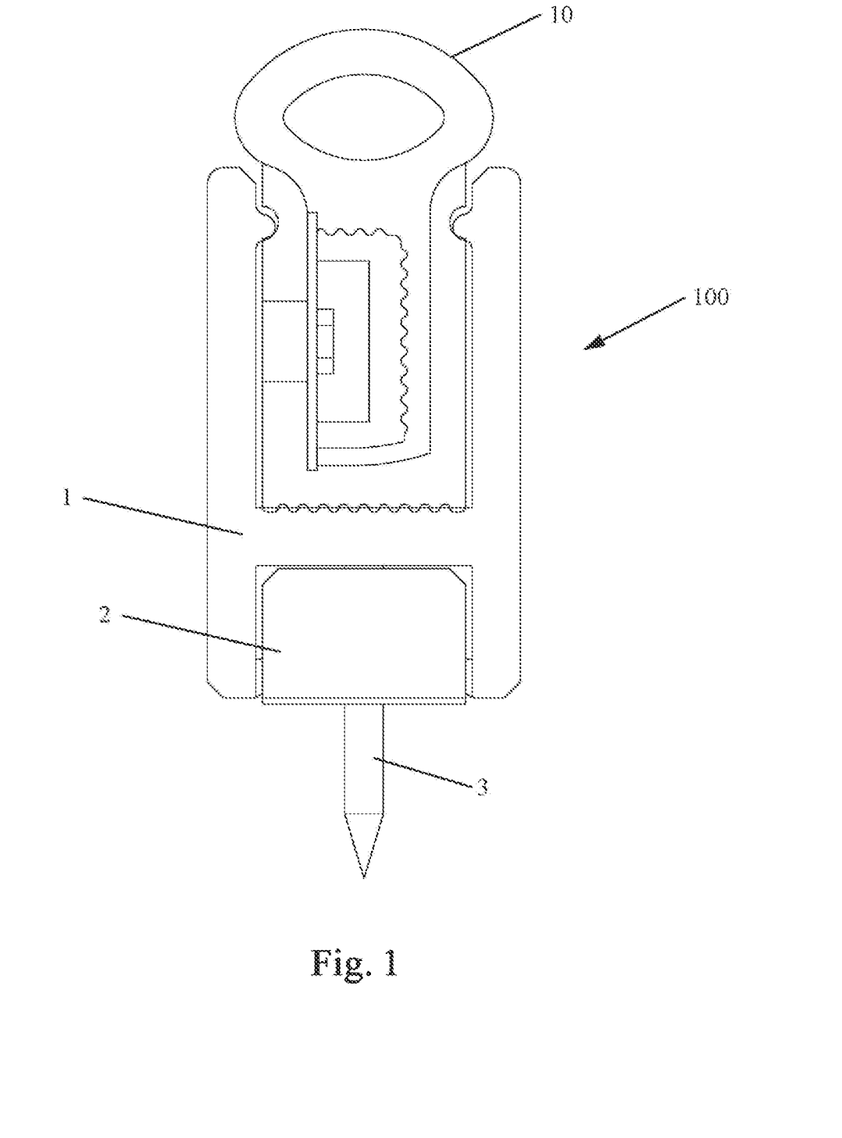
FIG. 1 is a schematic side view showing a strip mounting system according to a first embodiment of the present application, wherein a strip is mounted to the strip mounting system.

The strip mounting system 100 comprises a mounting clip 1 configured to removably receive the strip 10, and a mounting base 2 configured to be connected to the mounting clip 1 and to be removably connected by means of headless nails or traceless nails 3 to a surface to be mounted. As best shown in FIG. 1, in a state in which the strip 10 is mounted to the strip mounting system 100 that has been connected to the surface to be mounted (i.e. a use state in which the strip 10 and the strip mounting system 100 are eventually assembled together), the hammered end 31 (i.e. the end opposite to the tip intended to enter into the surface to be mounted) of the headless nail 3 is shielded by the strip 10 and cannot be seen. By means of the arrangement of the present application, the end 31 of the headless nail 3 and even the mounting base 2 are shielded by the strip 10 itself, thereby providing a good overall appearance. The number of headless nails 3 can be chosen as needed.

Figure 2:
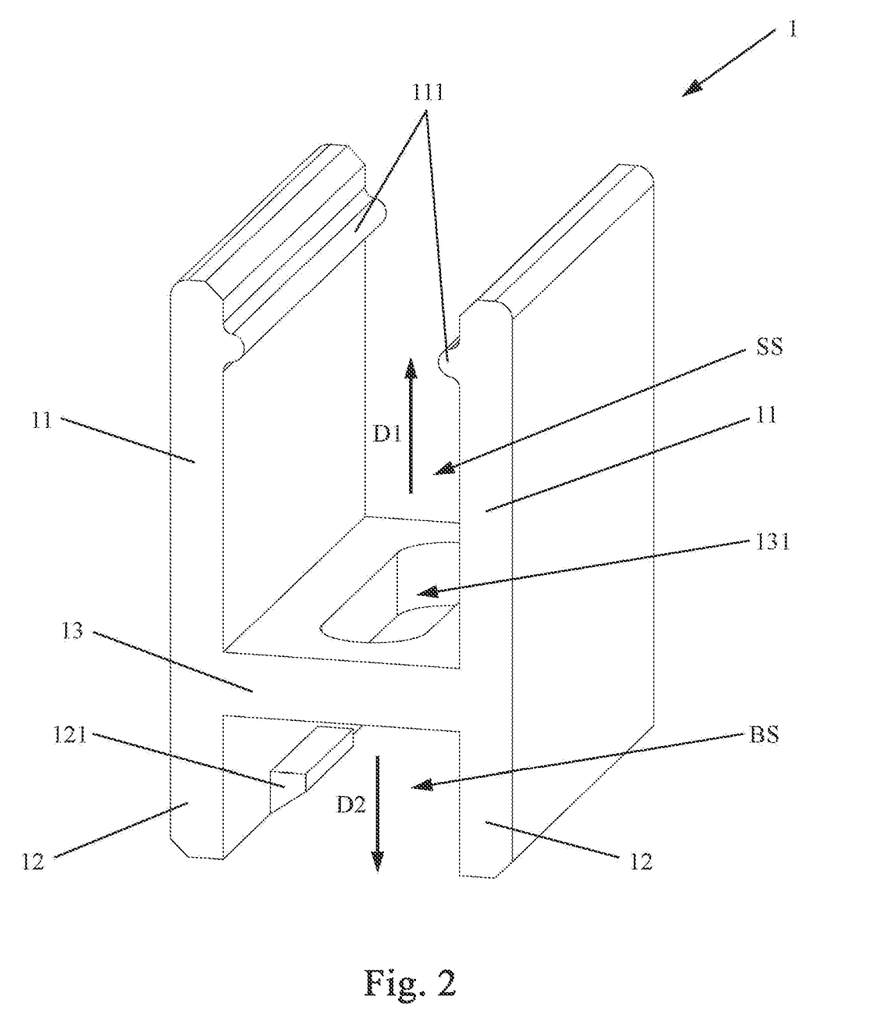
FIG. 2 is a schematic perspective view showing a mounting clip of the strip mounting system according to the first embodiment of the present application.
Figure 3:
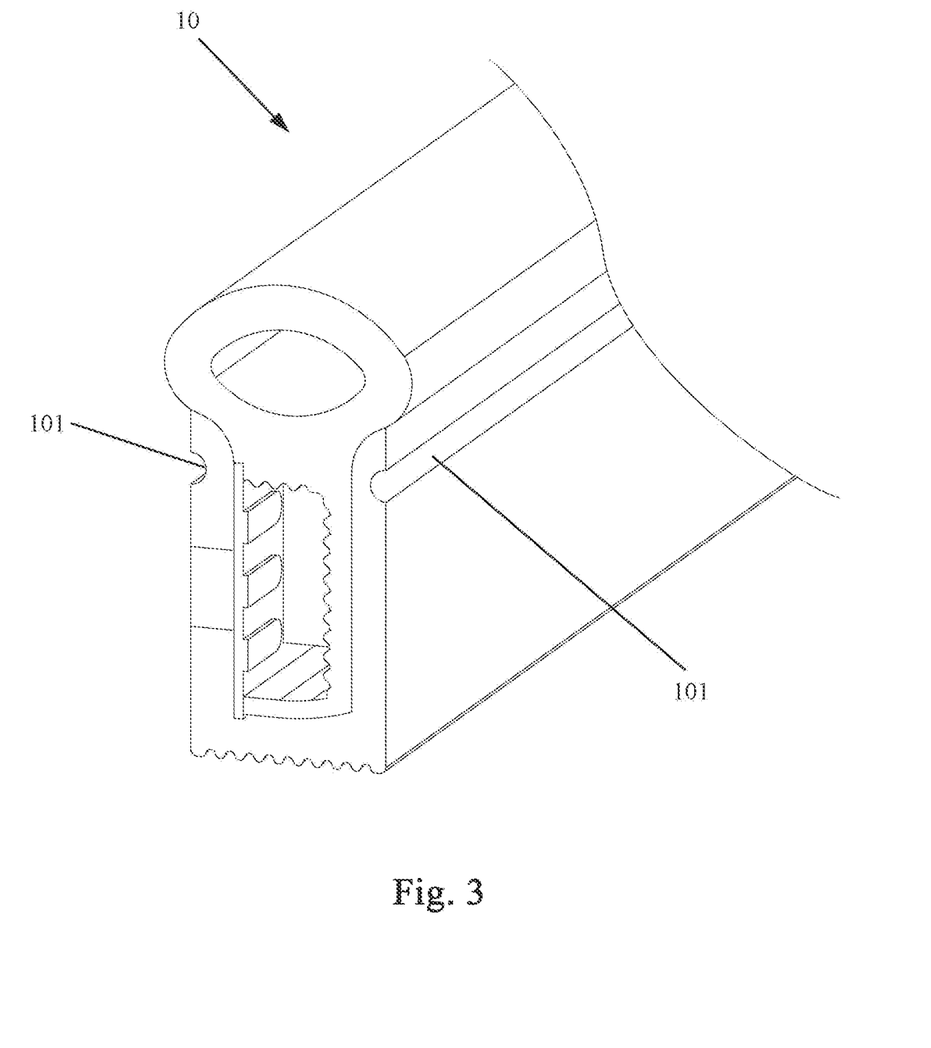
FIG. 3 is a schematic perspective view showing a strip.

As best shown in FIG. 2, the mounting clip 1 may comprise two first clamping jaws 11. The two first clamping jaws 11 extend parallel to each other in a first direction D1, such as the upward direction shown in the figure, to form a strip receiving space SS between the two first clamping jaws 11 for receiving the strip 10.

The connection between the strip 10 and the mounting clip 1 is not specifically limited as long as the strip 10 (particularly, at least a part of the strip 10) can be received or retained in the strip receiving space SS of the mounting clip 1. For example, in conjunction with FIGS. 2 and 3, a first protrusion 111 is provided on each of the surfaces of the two first clamping jaws 11 facing each other, and first recesses 101 in shape-fitting with the first protrusions 111 are provided on the strip 10, such that when the strip 10 is received in the strip receiving space SS, the strip 10 is fixed to the mounting clip 1 by means of the shape-fitting of the first recesses 101 with the first protrusions 111, wherein the number of the first protrusions 111 may be two as shown in the figures and two first recesses 101 are provided on the strip 10 correspondingly, but it is also possible to provide one first protrusion 111, and then correspondingly provide one first recess 101 on the strip 10. In other possible cases, the strip 10 may be fixed between the two first clamping jaws 11 by interference fit; whereas when the strip mounting system 100 is mounted on a horizontal surface to be mounted such that the mounting clip 1 is in the orientation shown in FIG. 2 in use, the strip 10 simply needs to be placed and received in the strip mounting system 100, even without the need for a fixed connection.

As shown in FIGS. 1 and 2, the mounting clip 1 may further comprise a base plate 13 configured to connect the two first clamping jaws 11, and two second clamping jaws 12 extending from the base plate 13 in a second direction D2 opposite to the first direction D1 to form a base receiving space BS between the two second clamping jaws 12 for removably receiving the mounting base 2. As shown in the side view of FIG. 1, the two first clamping jaws 11, the two second clamping jaws 12 and the base plate 13 of the mounting clip 1 have a substantially H-shaped structure; of course, the specific form of the mounting clip 1 is not limited thereto; and the base plate 13 does not have to be in a plate-like shape perpendicular to the first direction D1 or the second direction D2 as shown in the figure, but may be varied depending on the shape of the strip 10 and the shape of the mounting base, for example, inclined or curved.

Figure 4:
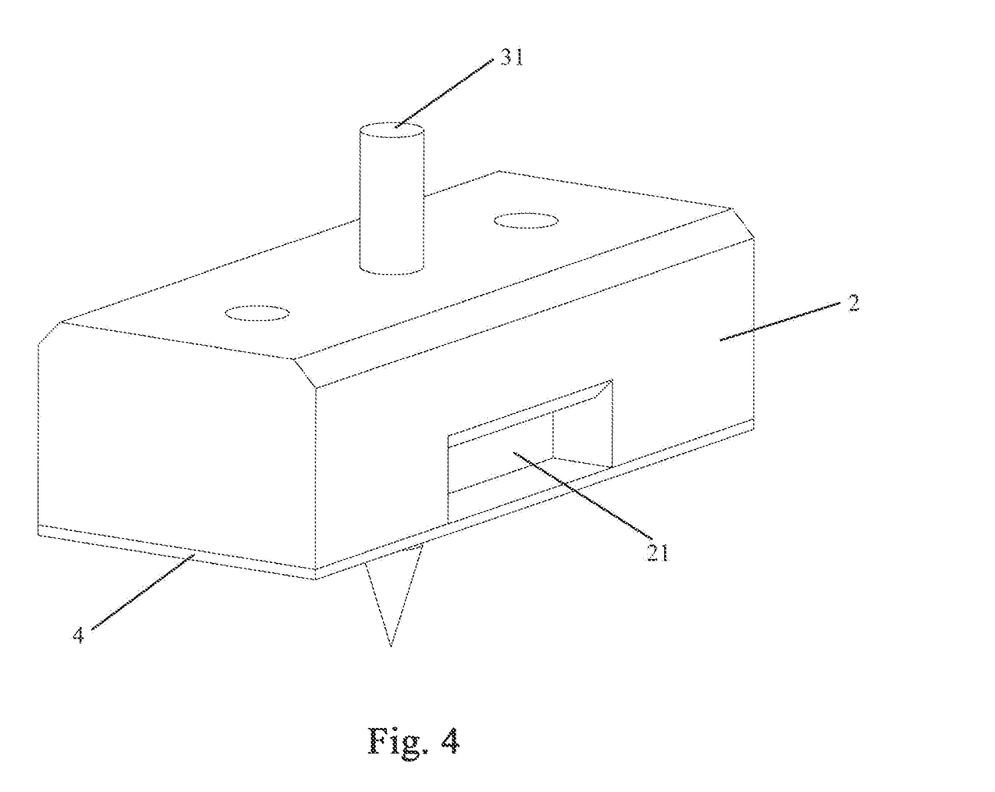
FIG. 4 is a schematic perspective view showing a mounting base of the strip mounting system according to the first embodiment of the present application.
Figure 5:
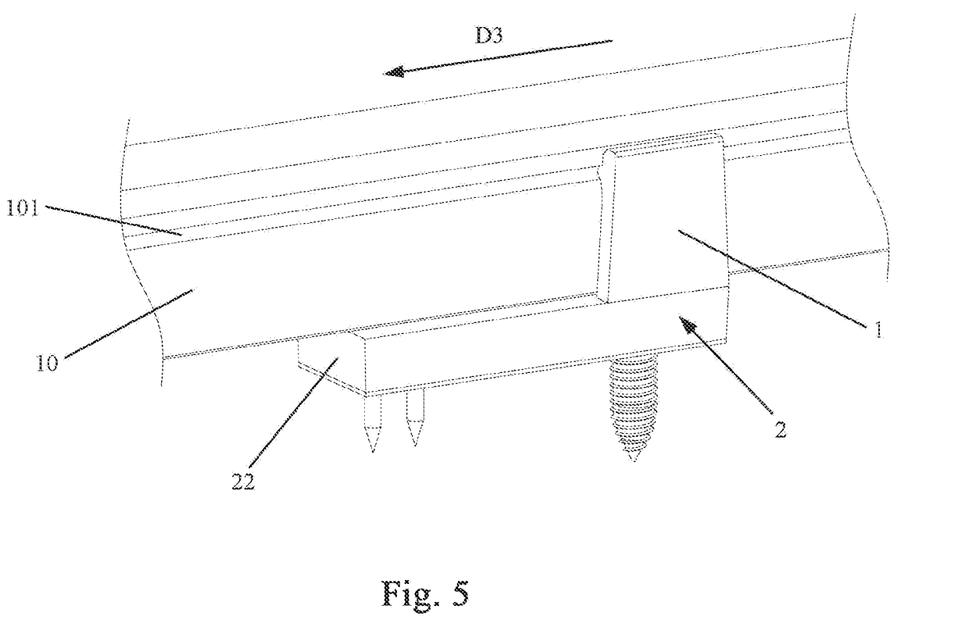
FIG. 5 is a schematic perspective view showing a strip mounting system according to a second embodiment of the present application, wherein a strip is mounted to the strip mounting system.

In the strip mounting system 100 of the first embodiment of the present application, the mounting clip 1 is configured to be removably connected to the mounting base 2. As shown in FIGS. 2 and 4, a second protrusion 121 is provided on each of the surfaces of the two second clamping jaws 12 facing each other, and second recesses 21 in shape-fitting with the second protrusion 121 are provided on the mounting base 2, such that when the mounting base 2 is received in the base receiving space BS, the mounting base 2 is fixed to the mounting clip 1 by means of the shape-fitting of the second recesses 21 with the second protrusions 121. Certainly, the connection between the mounting clip 1 and the mounting base 2 is not limited thereto, and the mounting base 2 may be fixed between the two second clamping jaws 12 by interference fit.

Preferably, the spacing between the two second clamping jaws 12 is equal to the spacing between the two first clamping jaws 11. By means of such an arrangement, it is possible to make the outer surfaces of the first and second clamping jaws 11 and 12 easy to be manufactured to have an integral flat shape, thereby further improving the appearance of the strip mounting system 100.

As shown in FIG. 4, the strip mounting system 100 further comprises a double-coated tape 4. The double-coated tape 4 is provided on the surface of the mounting base 2 that is in contact with the surface to be mounted. The double-coated tape 4 plays a role of positioning and pre-fixing during the mounting process of the mounting base 2, which will be described in detail below.

After the mounting base 2 is fixed to the surface to be mounted by hammering the end 31 of the headless nail 3, there may be a case where the end 31 of the headless nail 3 do not completely enter the mounting base 2 but a small part is left outside the mounting base 2. Accordingly, a through hole 131 extending in the first direction D1 may be provided in the base plate 13, and a part of the end 31 of the headless nail 3 that does not enter the mounting base 2 after being hammered may be accommodated in the through holes 131.

The usage of the strip mounting system 100 of the first embodiment of the present application will be described in detail below. Firstly, the mounting clip 1 and the mounting base 2 are assembled together, and the strip 10 is mounted on the mounting clip 1; then, the mounting base 2 is positioned and pre-fixed by using the double-coated tape 4, so as to enable same to be connected to a surface to be mounted; then, the strip 10 is removed from the mounting clip 1 and the mounting clip 1 is removed from the mounting base 2; the end 31 of the headless nail 3 is hammered, such that the headless nail 3 passes through the headless nail retaining hole in the mounting base 2 to fix the mounting base 2 to the surface to be mounted; and then, the mounting clip 1 is assembled to the mounting base 2, and the strip 10 is mounted on the mounting clip 1. By means of the arrangement of the strip mounting system 100 of the first embodiment of the present application, as the mounting clip 1 and the mounting base 2 are two parts independent of each other and removably connected together, in the process of hammering the headless nail 3, the mounting clip 1 is separated from the mounting base 2, and thus the hammering process is not affected by the mounting clip 1 itself.

Next, a strip mounting system 200 for mounting a strip 10 according to the second embodiment of the present application will be described, and the same parts as those in the first embodiment will not be repeated.

Referring to FIGS. 5 to 8, a strip mounting system 200 for mounting a strip 10 according to the second embodiment of the present application is shown. Unlike the case in the first embodiment where the mounting clip 1 and the mounting base 2 are two parts independent of each other, in the strip mounting system 200, the mounting base 2 is integral with two first clamping jaws 11, the mounting base 2 comprises a first surface 2a and a second surface 2b opposite to each other, and the two first clamping jaws 11 extend from the first surface 2a of the mounting base 2.

Figure 6:
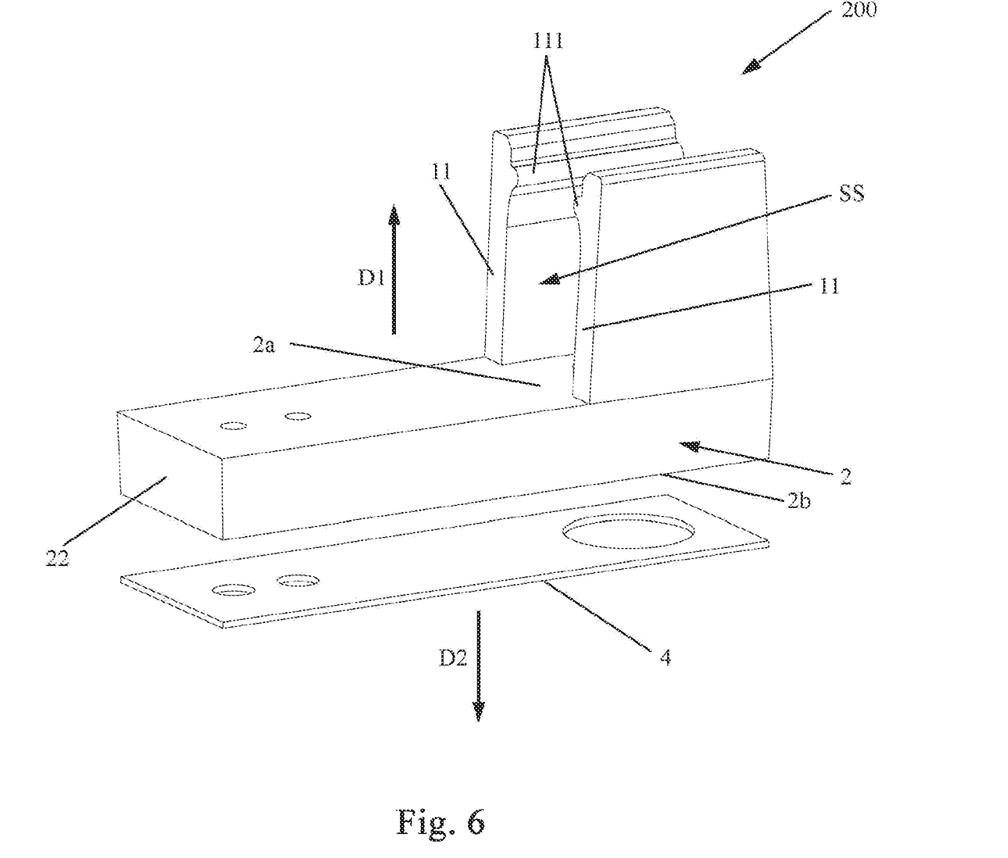
FIG. 6 is a schematic perspective view showing a strip mounting system according to the second embodiment of the present application, wherein the strip is removed and a double-coated tape is shown in an exploded form.

As best shown in FIG. 6, the mounting base 2 may further comprise a base extension 22 extending, perpendicular to the first direction D1 and parallel to the strip extension direction D3, beyond the strip receiving space SS, and the mounting base 2 is connected to the surface to be mounted by the headless nails 3 at the base extension 22. Due to the provision of the base extension 22, the hammering of the ends 31 of the headless nails 3 will be performed at the base extension 22, such that the hammering process will not be affected by the mounting clip itself (in the embodiment, the two first clamping jaws 11), and as the arrangement position of the headless nails 3 is far away from the first clamping jaws 11, it is not easy to accidentally damage the first clamping jaws 11 during the hammering process.

As shown in FIGS. 5-8, the strip mounting system 200 can further comprise a double-coated tape 4 being applied on the second surface 2b of the mounting base 2. The function of the double-coated tape 4 is similar to that in the first embodiment, and will not be repeated here.

Figure 7:
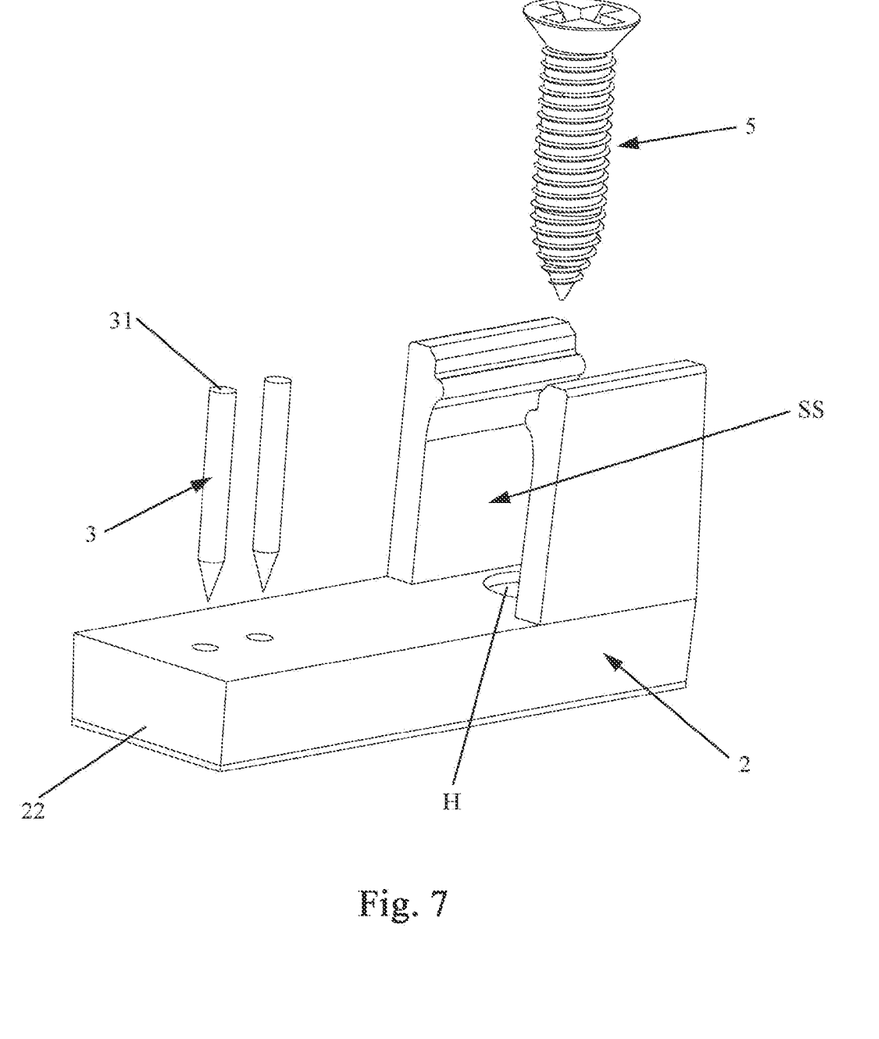
FIG. 7 is a schematic perspective view showing a strip mounting system according to the second embodiment of the present application, wherein headless nails and a screw are shown in an exploded form.
Figure 8:
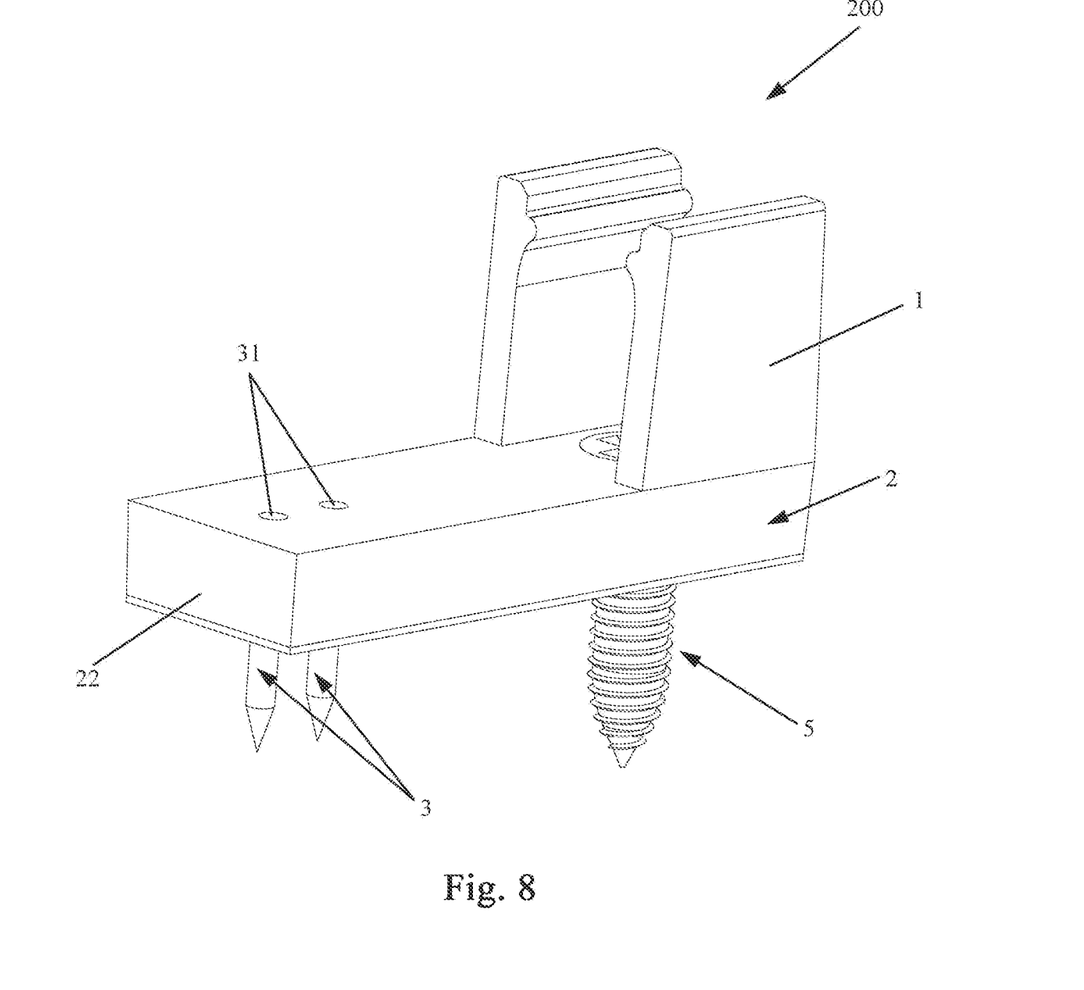
FIG. 8 is a schematic perspective view showing a strip mounting system according to the second embodiment of the present application, wherein the headless nails and the screw have been mounted to the strip mounting system.

As shown in FIGS. 7 and 8, a threaded through hole H extending in a first direction D1 may be provided in the mounting base 2, and the mounting base 2 is configured to be able to be fixed by means of a screw 5 passing through the threaded through hole H to the surface to be mounted. Preferably, the threaded through hole H is provided in the part of the mounting base 2 located at the strip receiving spaces SS, and with this arrangement, even in a case where the base extension 22 is provided to be long, the screw 5 and the headless nails 3 respectively provided near both ends of the mounting base 2 can fix the mounting base 2 to the surface to be mounted more stably. Of course, the mounting position of the screw 5 or the threaded through hole H is not limited thereto, and for example, the threaded through hole H may also be provided in the base extension 22.

By means of the strip mounting system 200 of the second embodiment of the present application, the integration of the mounting clip 1 and the mounting base 2 further simplify the usage steps, and by providing the base extension 22, enough space can be provided for the hammering process of the headless nails 3, and the ends 31 of the headless nails 3 are shielded by the strip 10 after mounting, thereby providing a good appearance.

The foregoing descriptions are merely exemplary embodiments of the present application, but are not intended to limit the present application. Any modification, equivalent replacement, or improvement made without departing from the spirit and principle of the present application shall belong to the scope of protection of the present application.

The invention claimed is:

1. A strip mounting system for mounting a strip, the strip mounting system comprising:
   a mounting clip configured to removably receive the strip; and
   a mounting base configured to be connected to the mounting clip and to be removably connected by means of headless nails to a surface to be mounted;
   wherein a threaded through hole extending in a first direction is provided in the mounting base, and the mounting base is configured to be fixed by means of a screw passing through the threaded through hole to the surface to be mounted; and
   wherein in a state in which the strip is mounted to the strip mounting system that has been connected to the surface to be mounted, hammered ends of the headless nails are shielded by the strip.

2. The strip mounting system for mounting a strip according to claim 1, wherein the mounting clip comprises two first clamping jaws, and the two first clamping jaws extend parallel to each other in a first direction to form a strip receiving space between the two first clamping jaws for receiving the strip.

3. The strip mounting system for mounting a strip according to claim 2, wherein a first protrusion is provided on each of the surfaces of the two first clamping jaws facing each other, and first recesses in shape-fitting with the first protrusions are provided on the strip, such that when the strip is received in the strip receiving space, the strip is fixed to the mounting clip by means of the shape-fitting of the first recesses with the first protrusions.

4. The strip mounting system for mounting a strip according to claim 2, wherein the mounting clip further comprises a base plate configured to connect the two first clamping jaws, and two second clamping jaws extending from the base plate in a second direction opposite to the first direction to form a base receiving space between the two second clamping jaws for removably receiving the mounting base.

5. The strip mounting system for mounting a strip according to claim 4, wherein a second protrusion is provided on each of the surfaces of the two second clamping jaws facing each other, and second recesses in shape-fitting with the second protrusions are provided on the mounting base, such that when the mounting base is received in the base receiving space, the mounting base is fixed to the mounting clip by means of the shape-fitting of the second recesses with the second protrusions.

6. The strip mounting system for mounting a strip according to claim 4, wherein the spacing between the two second clamping jaws is equal to the spacing between the two first clamping jaws.

7. The strip mounting system for mounting a strip according to claim 4, wherein the strip mounting system further comprises a double-coated tape being provided on the surface of the mounting base that is in contact with the surface to be mounted.

8. The strip mounting system for mounting a strip according to claim 4, wherein a through hole extending in the first direction is provided in the base plate, and a part of the end of each of the headless nails that does not enter into the mounting base after being hammered is accommodated in the through hole.

9. The strip mounting system for mounting a strip according to claim 2, wherein the mounting base is integral with the two first clamping jaws and comprises a first surface and a second surface opposite to each other, and the two first clamping jaws extend from the first surface of the mounting base.

10. The strip mounting system for mounting a strip according to claim 9, wherein the mounting base further comprises a base extension extending, perpendicular to the first direction and parallel to the strip extension direction, beyond the strip receiving space, and the mounting base is connected to the surface to be mounted by the headless nails at the base extension.

11. The strip mounting system for mounting a strip according to claim 9, wherein the strip mounting system further comprises a double-coated tape being applied on the second surface of the mounting base.

* * * * *